Sept. 19, 1967 R. J. PETSCHAUER ET AL 3,343,130

SELECTION MATRIX LINE CAPACITANCE RECHARGE SYSTEM

Filed Aug. 27, 1964 3 Sheets-Sheet 1

INVENTOR.
RICHARD J. PETSCHAUER
GARY A. ANDERSEN
Dugger, Bradlock, Johnson & Westman
ATTORNEYS INVENTOR.
RICHARD J. PETSCHAUER
GARY A. ANDERSEN
Dugger Braddock Johnson & Westman
ATTORNEYS INVENTOR.
RICHARD J. PETSCHAUER
GARY A. ANDERSEN
Dugger Braddock Johnson & Westman
ATTORNEYS 3,343,130
Patented Sept. 19, 1967

3,343,130

SELECTION MATRIX LINE CAPACITANCE RECHARGE SYSTEM

Richard J. Petschauer, Minneapolis, and Gary A. Andersen, Stillwater, Minn., assignors to Fabri-Tek Incorporated, Minneapolis, Minn., a corporation of Wisconsin Filed Aug. 27, 1964, Ser. No. 392,435
9 Claims. (Cl. 340—166)

This invention relates to means for recharging electronic circuits, and more particularly to such means comprising an electronic current driver in series with a plurality of electronic valves to selectively recharge electrical circuits more rapidly than by previous means.

Many electronic circuit applications, particularly in the data processing or computer art, employ high-speed electronic switching. The switching is usually performed by semiconductor devices such as transistors, which can switch from one conducting state to another at very high speeds. However, switching circuits utilizing such semiconductor devices are often limited by the relatively long time required to revert or become restored to an original or datum state to prepare for a subsequent pulse or operating event. Ordinarily, this delay is caused by capacitive components or elements arranged in the collector circuit of the semiconductor device. These capacitive components must be recharged or restored to a datum level before a subsequent switching operation can be performed.

In a magnetic core memory system employing coincident currents, coincident current pulses from two selection matrices must be precisely of predetermined magnitudes. If the predetermined magnitude is exceeded, other memory cores in addition to the selected core may be at least partially switched. If the currents are below the magnitude required for switching, the coincident currents may be insufficient to switch the selected core. The selection matrices in core memory systems often have considerable line capacitance and other internal losses which vary as a function of several external phenomena, and particularly with the time period between pulses. As a result, unless the lines are recharged or conditioned prior to each driving pulse, part of the input pulse will be employed to recharge the lines, and each output pulse will not be precisely determined by the input pulse. If they are recharged through a low ohmic resistance the recharge current can interfere with the switch operation and excessive power is consumed. If they are recharged through a high ohmic resistance, the recovery time is excessive.

The primary object of this invention is, therefore, to provide a switching circuit which will recover or revert to an original state in preparation for a subsequent operating event in a relatively short period of time and without excessive power consumption.

A further object of the present invention is to provide a recharge system to selectively recharge any one of a plurality of circuits with a single recharge current driver.

A further and more specific object of the present invention is to provide a scheme for recharging a selection matrix in an electronic memory system at a high rate of speed with relatively simple and inexpensive circuitry.

Further objects will become apparent as the discussion proceeds.

A circuit constructed according to the present invention accomplishes these oobjectives. It can recharge electrical circuits very rapidly, without the expenditure or dissipation of excessive power, and is suitable to be used to selectively recharge a plurality of circuits. This is accomplished by providing a current path from a power supply through a transistor to an output circuit. At the end of each current pulse through the output circuit, said transistor is made momentarily conductive. A diode is wired in series with said transistor to provide isolation. When the recharged circuit is used with a plurality of output circuits, a diode is added in series with each output circuit. This isolates the line capacitances and permits the recharge circuit to conduct current selectively only into the output circuit which just previously had conducted a current pulse. In this way, the discharge circuit is rapidly recharged.

Figure 1:
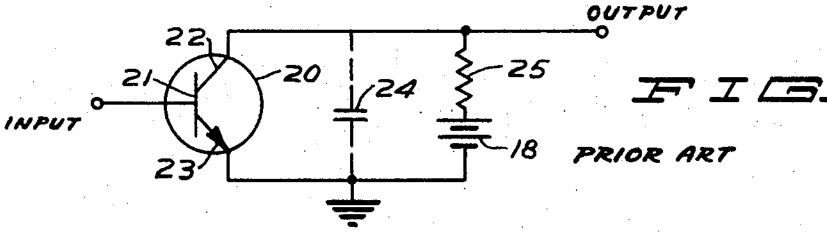
FIG. 1 PRIOR ART
FIG. 1 is a simplified schematic drawing of a typical switching circuit, in accordance with switching circuits known in the art.

Referring to the drawings, in FIG. 1 a semiconductor switching device 20 may be a transistor of any suitable construction and includes an emitter electrode 23, a collector electrode 22, and a base electrode 21. A bias voltage applied to the base 21 will keep the transistor nonconducting. In other constructions, the switching device may be a Silicon Controlled Rectifier (SCR) with cathode, anode, and gate substituting for 23, 22 and 21 respectively.

In operation, the transistor 20 is normally non-conducting. When in this state, the capacitance 24, which may be conveniently thought of as line capacitance between the emitter and collector lead conductors, is charged to the voltage of the power supply 18 through the resistor 25. When a positive pulse is applied from the input to the base 21, the transistor 20 becomes conducting and a pulse passes through the emitter-collector circuit of the transistor, discharging the capacitance 24. Since there is relatively little resistance in this circuit, it discharges very rapidly. The transistor 20 becomes non-conductive again when the input pulse is removed. Since the capacitance 24 was discharged during the pulse, the collector 22 will not return to the normal pre-pulse state until the capacitance 24 has recharged through resistor 25. In the typical circuit this resistor has a high ohmic value which permits the capacitance to recharge at only a relatively slow rate. This significantly reduces the effective pulse rate in many applications.

Figure 2:
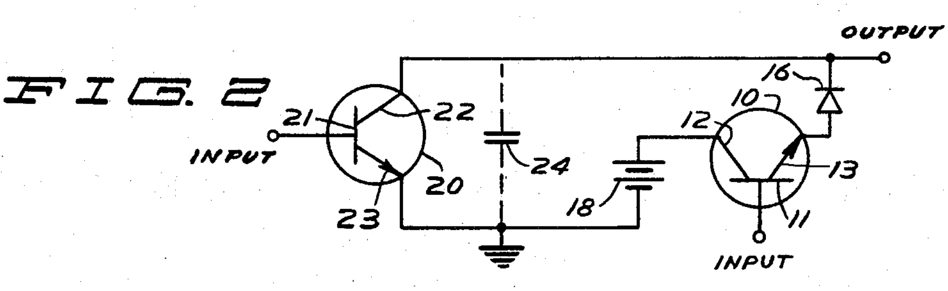
FIG. 2 is a schematic drawing of a simplified switching circuit with an elementary form of the recharge circuit of the invention added.

In FIG. 2, parts corresponding to those in FIG. 1 are designated by similar reference numerals. In addition, there is added a recharge transistor 10, with base 11, collector 12, and emitter 13, and an electronic valve 16. The electronic valve may be a semi-conductor diode with anode and cathode electrodes or may be any asymmetrical current conducting device. This recharge circuit provides a recharge path of very low resistance. The effect is to greatly accelerate the recharge speed by lowering the impedance of the circuit. The operation of the circuit will become apparent from a discussion of FIG. 3.

Figure 3:
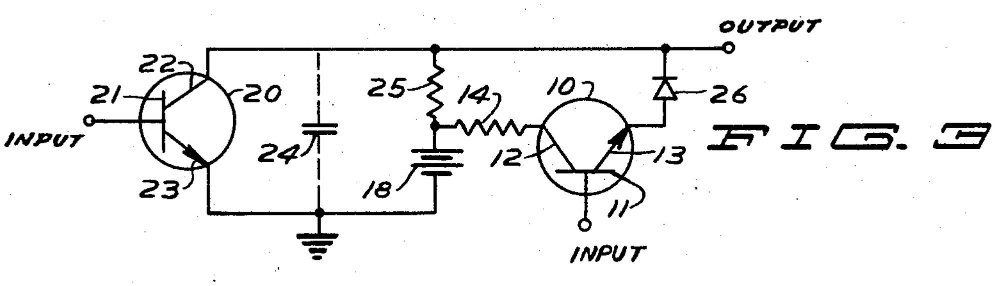
FIG. 3 is a schematic drawing of a simplified switching circuit with a recharge circuit of the invention as used in a multiple circuit added.

The circuit of FIG. 3 is identical to that of FIG. 2 except for the inclusion of the resistance 14 with the electronic valve 26 in the recharge circuit. In addition, the recharge resistor 25 is left in the circuit. The effect is to provide parallel recharge paths through resistor 14 and resistor 25. Resistor 14 will normally be of much lower ohmic value than resistor 25, so the effective resistance of the recharge circuit will be that of resistor 14.

The electronic valve is included to provide isolation for the recharge circuit. It has an additional function in multiple circuits as shown in FIGS. 4 and 5.

In operation, both transistors are normally nonconductive. When a trigger pulse is applied to the base 21 of transistor 20, the transistor conducts and discharges the capacitance 24 as in the circuit of FIG. 1. Upon termination of the input pulse, transistor 20 becomes nonconductive and the capacitance 24 begins to charge to the battery potential through resistor 25. However, in order to accelerate the recharge of capacitance 24, very shortly after the termination of the input pulse to transistor 20, a second input pulse is applied to base 11 of transistor 10, which makes transistor 10 become conductive. This makes line capacitance 24 begin to recharge through the parallel resistors 14 and 25 as described in the foregoing paragraph. Since resistor 14 can be chosen to be of a considerably lower ohmic value than resistor 25, this greatly reduces the time required to recharge the capacitance. The input pulse to transistor 10 remains for a time sufficient to provide adequate capacitance recharge. The time required for recharge is determined by the values of capacitance 24 and resistors 25 and 14. After transistor 10 has remained conductive for a sufficient time to recharge capacitance 24, the pulse to the base 11 is terminated. The system is then in its original state.

Figure 4:
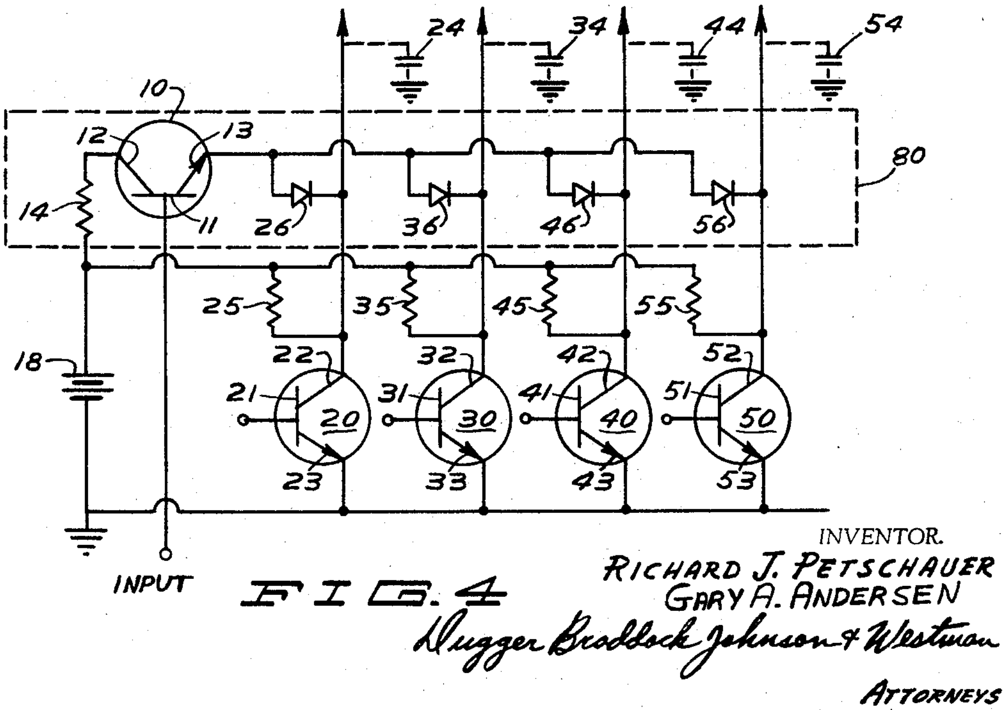
FIG. 4 shows a plurality of switching circuits with a single recharge current driver.
Figure 5A:
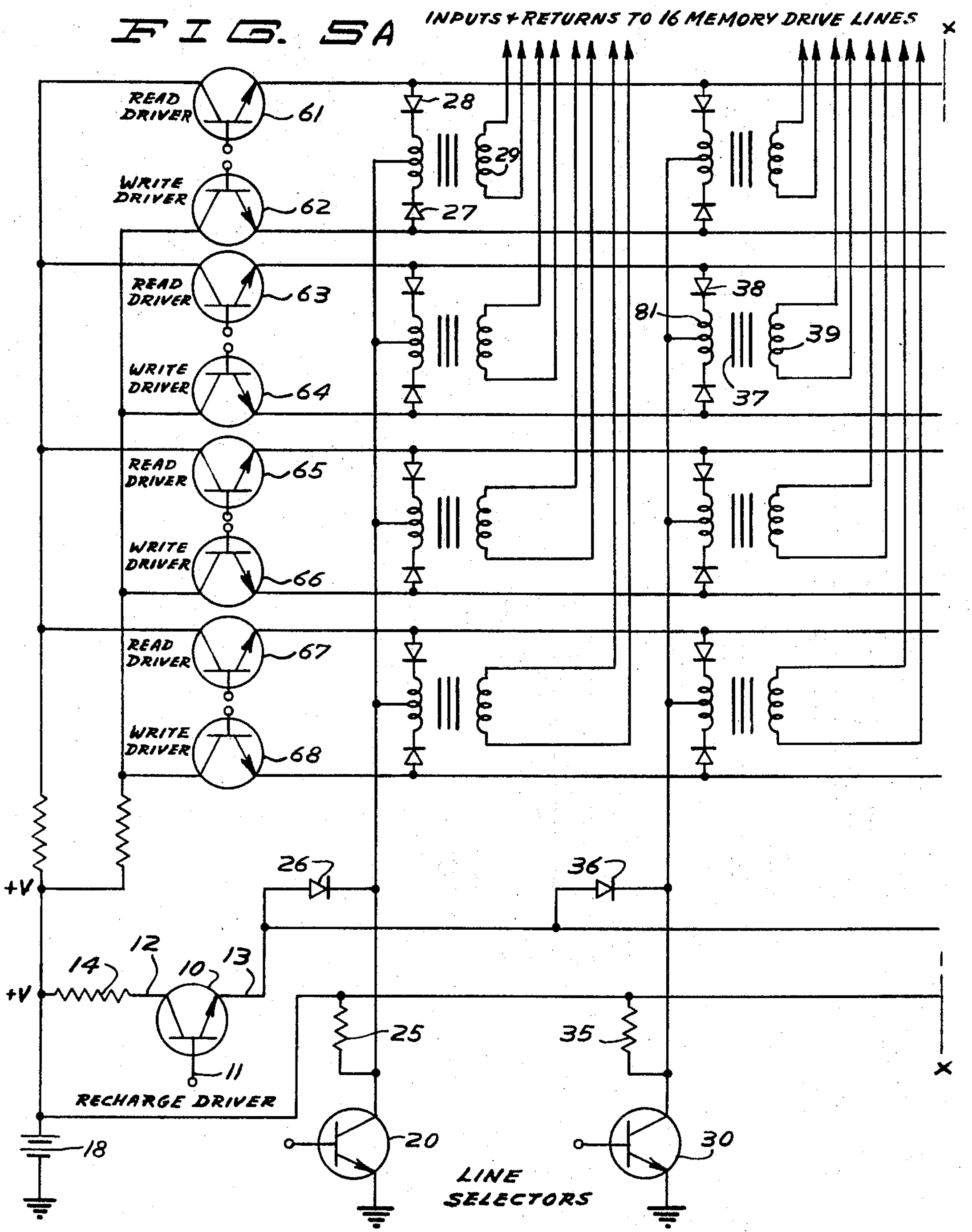
FIG. 5 shows a recharge circuit of the invention incorporated into a four-by-four selection matrix for a computer memory system. For clarity the figure is shown on two sheets as FIG. 5A and FIG. 5B and is broken on the line X—X.
Figure 5B:
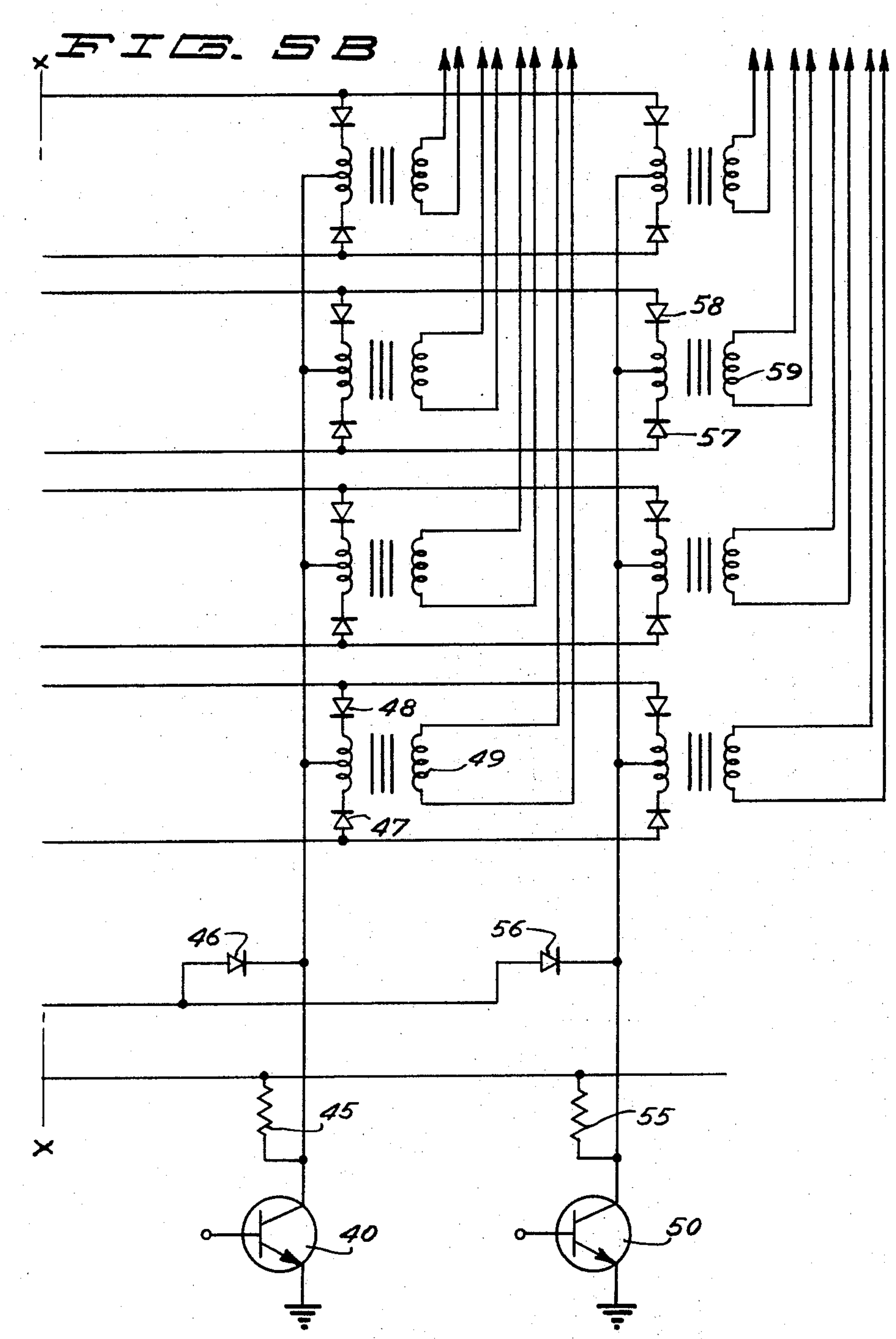

FIG. 4 shows the recharge circuit of FIG. 3 incorporated into a multiple switching circuit. The recharge circuit is enclosed by a dotted box 80. Again, corresponding circuit elements are designated by similar reference numerals. In particular, transistor 10 is a recharge current driver and diodes 26, 36, 46 and 56 constitute an OR logic circuit. It will be observed that the use of the OR logic circuit enables a recharge circuit to be constructed for multiple switching circuits employing just one current driver, plus one power resistor and one diode per switching circuit. Recharge circuits shown in the prior art such as U.S. Patent No. 3,105,160 to Adler, require a current driver for each switching circuit.

In operation, all transistors are normally nonconductive. When a trigger pulse is applied to the base of one switching transistor, for example, the base 31 of transistor 30, the transistor conducts and discharges the capacitance as in the circuits of FIG. 3. Upon termination of the input pulse, transistor 30 becomes non-conductive, and the line capacitance 34 begins to charge to the battery potential through resistor 35. Again, however, in the operation of the invention, very shortly after the termination of the input pulse to transistor 30, a second input pulse is applied to base 11 of transistor 10 which makes transistor 10 become conductive. This makes line capacitance 34 being to charge to its final state through the parallel combination of resistors 14 and 35. The low ohmic value of resistor 14 again greatly reduces the time required to recharge line capacitance 34 to its final value. The input pulse to base 11 of transistor 10 remains on for a time sufficient to adequately recharge line capacitance 34 through diode 36.

The diodes 26, 36, 46 and 56 serve to isolate the recharge current in order that this energy is channeled into the discharged circuit without disturbing the other circuits. In addition, they serve as blocking diodes to prevent the output pulse of the firing circuit from appearing as a spurious pulse in the other circuits.

FIG. 5 shows the recharge circuit incorporated into a four-by-four selection matrix for a computer memory system. In operation, a four-by-four selection matrix drives sixteen memory drive lines which address one axis of the memory core matrix. Such a memory matrix consist of a sixteen-by-sixteen or two hundred fifty-six word memory. The memory is addressed by two four-by-four selection matrices, one along each axis. Each selection matrix selects a memory drive line in response to the coincident address of a line selector and a current driver. For example, read driver transistor 63 and line selector transistor 30 may be addressed. The address signals apply coincident pulses to the bases of both of these transistors, rendering both of them conductive. A current pulse is then conducted through transistors 63, diode 38, the top half of the primary winding 81 of transformer 37, and transistor 30. This induces a pulse in the secondary winding 39 of transformer 37. This induced transformer pulse drives the selected line (output of 39) in the memory matrix. A large amount of capacitance is present in the individual selector circuits due to the necessary wiring and transformer center taps, and the resultant leakages. It is this capacitive component which must be recharged in each cycle to maintain uniform output pulses. The usual practice before the present invention was to connect a resistor to each selector circuit in series with a power supply. In a particular application that has been made of this circuit, the voltage from the power supply 18 is 45 volts. Without the recharge circuit of the present invention, the recharge resistors 25, 35, 45 and 55 are capable of dissipating ten watts of energy with a resistance value of 470 ohms. With a total capacitive load of 350 micro-microfarads, a practical worst-case situation, about 500 nanoseconds ($500\times10^{-9}$ seconds) is required for 95% recharge of the selector circuit. Since three RC time constants give 95% recharge, the recharge time is: $3\times R\times C=3\times470\times350\times10^{-12}=493\times10^{-9}$ seconds.

With the recharge circuit of the present invention being utilized, it will be appreciated that the operation of the circuit of FIG. 5 is similar to the operation of the circuit of FIG. 4. The recharge resistors are made much larger than 470 ohms and much larger than resistor 14, so that the effective recharge resistance is the resistance of resistor 14. A 150 ohm resistor 14 has been effectively used for this purpose. With the same values as used previously, this system gives a substantially lower recharge time of about 150 nanoseconds:

$$3RC=3\times150\times350\times10^{-12}=157\times10^{-9}\text{ seconds}$$

The larger recharge resistors prevent the flow of excessive additional current in line selector transistors, but they do not have to be of a sufficiently large power rating to handle a correspondingly large current which would flow with a low ohmic value when a line selector is continuously conducting, a situation which can occasionally arise due to faulty timing pulses in the related equipment. The large recharge resistors serve only to recharge any capacitive noise that may develop after a recharge pulse and to compensate for any leakage currents of the associated diodes.

What is claimed is:

1. In an electrical circuit recharge system comprising a periodically energized circuit having to source of electrical energy, a device utilizing such energy and means linking said source and said device, the system having a capacitive electrical component which is at least partially discharged upon energization of the circuit; an asymmetrical circuit device having input means and output means, signal means in circuit with input means to control the conduction state of said asymmetrical current conducting device, a power supply means in circuit with said output means and providing current flow in said output means in a certain predetermined direction, and unidirectional conducting apparatus disposed in said output means providing low impedance to current flow in said predetermined direction and high impedance to current flow in a direction opposite to said predetermined direction, said output means being coupled to said linking means and being adapted to recharge the said capacitive component to a predetermined level.

2. An electric circuit recharge system as described in claim 1 in which resistor means are electrically connected in series with said power supply and said asymmetrical current conducting device.

3. An electrical circuit recharge system as described in claim 1 in which a first resistor is electrically connected to said power supply and said output in parallel with the asymmetrical current conducting device.

4. An electric circuit recharge system as described in claim 3 in which a second resistor is electrically connected between said power supply and said output in series with the asymmetrical current conducting device, the two resistors functioning as a current divider.

5. In an electrical circuit recharge system comprising a periodically energized circuit having a source of electrical energy, a device utilizing such energy and means linking said source and said device, said system having a capacitive electrical component which is at least partially discharged upon energization of the circuit; a semiconductor device including a base electrode, a collector electrode, and an emitter electrode, a power supply means, an electronic valve, an input circuit to said semiconductor device having an impedance means rendered intermittently conducting and non-conducting in response to a predetermined signal, and an output from said semiconductor device coupled to said linking means, said valve being disposed in said output between said semiconductor device and said linking means, said semiconductor device being electrically coupled to said power supply and having a conducting state and a non-conducting state, and means for switching said semiconductor from said non-conducting state to said conducting state, the arrangement being such that when said semiconductor is in a conducting state the capacitive component of said periodically energized circuit is recharged to a predetermined level.

6. In an electrical circuit recharge system for a switching network comprising a plurality of periodically energized circuits having a source of electrical energy, a plurality of devices utilizing said energy, and means linking said source and said devices, each of said periodically energized circuits having a capacitive electrical component which is at least partially discharged upon energization of the circuit; a semiconductor device including a base electrode, a collector electrode, and an emitter electrode, and having a conducting state and a non-conducting state, input means in circuit with said semiconductor device, output means in circuit with said semiconductor device and being coupled to said linking means, a power supply, a plurality of electronic valves, each of said valves being electrically coupled to said semiconductor device and to one of said periodically energized circuits, said semiconductor device being electrically coupled between said power supply and said valves, and means for switching the semiconductor device from said non-conducting to said conducting state whereby when said semiconductor device is in said conducting state, the capacitive component of said periodically energized circuit will be recharged to a predetermined level.

7. In a selection matrix recharge scheme comprising a selection matrix for a computer memory system and having a plurality of periodically energized circuits, each having a source of electrical energy, a device utilizing such energy, and means linking said source of electrical energy and one of said devices, said system having a capacitive electrical component which is at least partially discharged upon energization of the circuit; a semiconductor device including a base electrode, a collector electrode, and an emitter electrode, and having a conducting state and a non-conducting state, input means in circuit with said semiconductor device, output means in circuit with said conductor device and being coupled to said linking means, a power supply, a plurality of electronic valves, each being disposed in said output between said semiconduction device and one of said periodically energized circuits, the output of said semiconductor device being electrically connected to said power supply through a series resistor and being adapted to reharge said capacitive component in said periodically energized circuit to a predetermined level in a predetermined period of time.

8. An electrical circuit recharge system comprising: at least one source of electrical energy; a device utilizing such energy; a circuit linking said source and said device; and recharge means; said device having a capacitive component which at least partially discharges upon energization of said circuit; said recharge means comprising a first electronic valve having a control electrode and two terminal electrodes and a second unidirectional electronic valve; said first electronic valve being switchable between a conducting state and a non-conducting state; said two terminals of said first electronic valve being electrically connected in series between said source of electrical energy and said second valve; and said second valve being electrically connected in series between said first electronic valve and said device whereby said first electronic valve may be switched to a conducting state in response to an electrical signal applied to its control electrode thereby to cause an electrical current to flow from said source of electrical energy to said device.

9. The combination as specified in claim 8 wherein the source of electrical energy consists of a first power supply and a second power supply, said first power supply providing power for said device, and said second power supply being connected to said first electronic valve to provide power for said recharge means.

No references cited.

NEIL C. READ, *Primary Examiner.*

H. I. PITTS, *Assistant Examiner.*